United States Patent
Seger et al.

(10) Patent No.: US 8,760,547 B2
(45) Date of Patent: Jun. 24, 2014

(54) IMAGE CONVERTER

(75) Inventors: Ulrich Seger, Leonberg-Warmbronn (DE); Hans-Georg Drotleff, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 550 days.

(21) Appl. No.: 13/018,845

(22) Filed: Feb. 1, 2011

(65) Prior Publication Data

US 2011/0254960 A1     Oct. 20, 2011

(30) Foreign Application Priority Data

Feb. 15, 2010   (DE) .......................... 10 2010 001 918

(51) Int. Cl.
*H04N 5/335*    (2011.01)
*H04N 9/64*     (2006.01)

(52) U.S. Cl.
USPC .......................................... 348/308; 348/243

(58) Field of Classification Search
CPC ....... H04N 5/335; H04N 5/361; H04N 5/378; H04N 5/3696; H04N 17/002; H04N 3/155
See application file for complete search history.

(56) References Cited

U.S. PATENT DOCUMENTS

| | | | |
|---|---|---|---|
| 6,917,029 B2 * | 7/2005 | Dierickx | 250/208.1 |
| 7,852,385 B2 * | 12/2010 | Mauritzson | 348/241 |
| 8,120,677 B2 * | 2/2012 | Ukita et al. | 348/241 |
| 8,179,461 B2 * | 5/2012 | Suzuki et al. | 348/294 |
| 2006/0250513 A1 * | 11/2006 | Yamamoto et al. | 348/294 |
| 2012/0019699 A1 * | 1/2012 | Masuda et al. | 348/308 |

FOREIGN PATENT DOCUMENTS

JP      2007-288479     * 11/2007

* cited by examiner

*Primary Examiner* — Luong T Nguyen
(74) *Attorney, Agent, or Firm* — Kenyon & Kenyon LLP

(57) ABSTRACT

An image converter includes: a pixel array having multiple imager pixels for outputting imager pixel signals, and a readout and processing device for reading out the pixel array and for receiving and processing the imager pixel signals. The pixel array has multiple reference pixels for outputting reference pixel signals, and at least one reference current device for outputting reference currents to the reference pixels for simulating illumination intensities. The readout and processing is adapted to jointly read out, receive, and process the reference pixel signals and the imager pixel signals.

8 Claims, 4 Drawing Sheets

IMAGE CONVERTER

CROSS-REFERENCE TO RELATED APPLICATIONS

The present application claims priority to Application No. 10 2010 001 918.6, filed in the Federal Republic of Germany on Feb. 15, 2010, which is expressly incorporated herein in its entirety by reference thereto.

FIELD OF THE INVENTION

In cameras, such as those used in the automotive field, for example, an image converter is generally provided behind the camera lens which receives the incident radiation and provides an image which is resolved in two dimensions. The image converter is manufactured using CMOS or CCD technology, for example, and has a pixel array having multiple imager pixels from which the image signals are output for the subsequent image evaluation and, for example, representation of the image on a display device. An analog processing device, for example for filtering, and an analog-digital converter are generally provided at the pixel array, and digital processing and outputting to an external control device, for example a control module such as a microcontroller or FPGA, are subsequently carried out. This control device is able to adjust image control parameters, for example the integration time, the dynamic reset level, subaddress regions, in particular so-called AOIs, and the A/D converter characteristics, via a control interface.

In general, the self-monitoring of the image converter or image sensor is problematic. Thus, it is difficult or impossible for the external control device to recognize when the image converter is defective or is transmitting erroneous image data. In particular, image data which do not correspond to the image control parameters adjusted via the control interface, or which do not correspond to the visual setting in terms of the image refresh rate, must be regarded as erroneous. In order to detect the dark currents in the pixels which are not caused by the external incidence of light, dark pixels are sometimes provided which are shielded from external light incidence, for example by the metal mask provided in the pixel array, also between the imager pixels, and which therefore output only the dark currents caused, for example, by thermal excitations of the photodiode. As the result of the imager pixels thus being read out together with the dark pixels, it is possible to recognize dark currents, and on this basis to adjust the image control parameters. It is also conventional to read out and monitor register queries and parity checks of the transmitted data via the control interface.

However, these control mechanisms or signal monitoring systems are not able to check in particular for errors or inaccuracies in the processing of the pixel signals in the analog range, including the analog-digital conversion as well as the subsequent digital processing, and, if necessary, to check for errors in the timing or the synchronization of the image converter.

SUMMARY

According to example embodiments of the present invention, in addition to the imager pixels, reference pixels are provided in the pixel array which are acted on by reference currents. The reference currents may be output in particular by reference current sources which are connected in parallel to the photodiode, together with a parasitic capacitor, which is formed in each pixel. Thus, the reference currents simulate the photocurrent which is output by the photodiode and which charges the parasitic capacitor, which in turn is read out by the pixel architecture and the readout circuit.

Unlike dark pixels which are known per se, and which according to example embodiments of the present invention may in particular be additionally provided and which are exposed only to thermal noise and other effects, the reference pixels are thus acted on by the reference currents in a defined manner in order to reproduce or simulate appropriate illuminations or grayscale values. According to example embodiments of the present invention, with regard to the level of effort very simple checking is made possible which is carried out substantially by comparing the setpoint grayscale values, expected on the basis of the adjusted reference currents, to the grayscale values ascertained in the image signals of the reference pixels.

According to example embodiments of the present invention, the multiple reference pixels may be acted on in particular by different reference currents. An expected grayscale value range or intensity range may be varied between a minimum value, which may correspond to the dark current, for example, and a maximum expected brightness value, it being possible to cover this range linearly or logarithmically, for example, as a result of the different reference current values.

Several advantages are thus achieved. The entire signal path between the pixels of the pixel array and the subsequent signal processing in the image converter may be checked in particular for continuity and integrity. The known and adjusted reference current values may be compared to the expected grayscale values of the image signals generated in the image converter. It is thus possible to directly check for proper signal transmission or, if necessary, for errors.

The reference current sources may be fixed, or may be configured by the external control device, for example. Due to the fact that the reference currents are adjustable, in each case a test pattern or reference pattern may be suitably modified, for example also as a function of the particular use, for example also as a function of the expected brightness values and optionally color values. The image signal which is output by the reference pixels may be compared to the setpoint value, taking the set conversion characteristic curve into account. A match of the two values indicates an intact readout path in the analog and the digital ranges, as well as an absence of errors in the control interface and in the timing for the control and readout of the image converter. Thus, the entire readout path of the image converter may also be monitored by the external control device, of which use may be made in particular in safety-relevant applications without redundant sensors.

By varying the test pattern via the position of its supply point, i.e., its address, and by varying over the complete valid or allowed signal range, it is also possible to discover artifacts in the signal path which have resulted in previously unnoticed image distortions due to thermal or mechanical strain or electrically controlled signal conduction.

Another advantage is that this checking is possible with little outlay of hardware; it is necessary only to expand the pixel array by a few pixels, for example an upper and a lower row of reference pixels, and to provide the reference current sources. The pixel signals of the reference pixels are subsequently read out together with the pixel signals of the imager pixels and optionally the dark pixels and processed, thus requiring no further effort. For the high integration densities of the pixel arrays which are already currently achievable, additionally providing one or two rows, or diminishing the matrix range of the imager pixels by one to two rows, is generally not a problem. The reference pixels may be provided in particular outside of or at the edge of the imager range, and therefore do not interfere with the image recording and image signal quality. The reference current devices may be designed with relatively little complexity, and in terms of circuitry may be connected in parallel very easily to the photodiode and its parasitic capacitor formed by the pixel. The reference pixels as well as the dark pixels may be shielded using the metal layer which is already present.

The different current values may be achieved digitally, for example using a chargeable register with subsequent digital-analog conversion, in order to systematically cover the expected grayscale value range of the image. According to example embodiments of the present invention, the test pattern supply structures may be expanded to multiple structures, it being possible to make separate use of cell structures above and below the array and of row and column structures, in order to check the data integrity to a very high degree.

According to example embodiments of the present invention, a device composed of the image converter and the connected control device is also provided, the control device being able to program or adjust the reference current values; it is thus possible, for example, to provide better checking of expected brightness values or also spectral values according to various requirements, or, for detecting an error, to carry out further checks, for example in the relevant grayscale value range.

DETAILED DESCRIPTION

Figure 1:
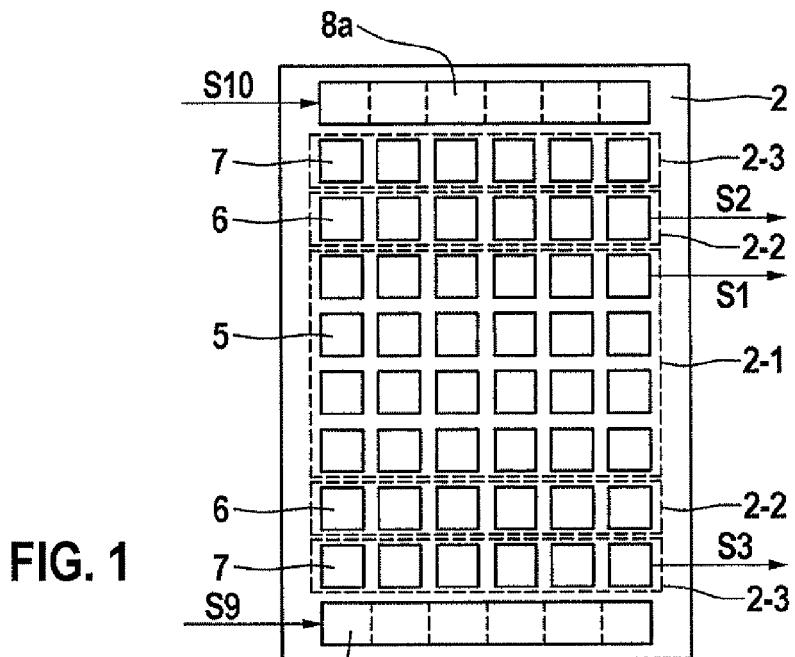
FIG. 1 shows a pixel array of an image converter according to an example embodiment of the present invention.
Figure 2:
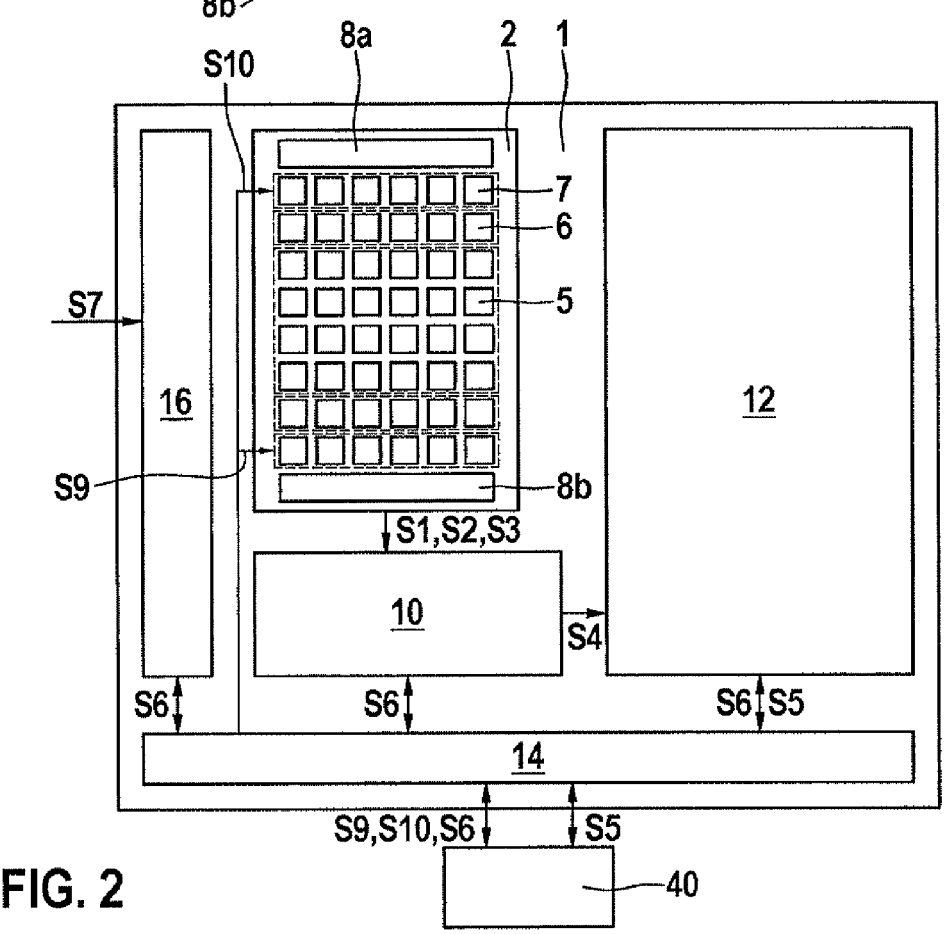
FIG. 2 shows an image converter.

FIG. 2 shows an image converter 1, which, as shown in greater detail in FIG. 1, has a pixel array 2 having a matrix system of individual pixels 5, 6, 7, in the present case having eight rows, for example—that is, the number of rows i=1 through 8, and having six columns, i.e., j=1 through 6. The dashed lines in FIG. 1 are provided solely to illustrate the individual types of pixels. The middle four rows, i.e., having row number i=3 through 6, are designed as imager pixels 5 for detecting an image, and thus form a 4×6 submatrix 2-1 of pixel array 2. A row 2-2 composed of six dark pixels 6 is respectively situated above and below imager pixel submatrix 2-1. Dark pixels 6 are provided in the substrate similarly as for imager pixels 5, except that they are "shielded," i.e., covered. Imager pixels 5 output imager pixel signals S1, which are read out line by line, for example. FIG. 1 shows an example of such an imager pixel signal S1. Dark pixels 6 are likewise read out line by line, and they output dark pixel signals S2 which are used in the image processing for evaluating imager pixel signals S1 in order to subtract the dark current.

According to example embodiments of the present invention, reference pixels 7 (monitor pixels) are also provided in pixel array 2, and are situated in two reference pixel rows 2-3 which according to FIG. 1 are respectively located below lower dark pixel row 2-2 and above upper dark pixel row 2-3. Reference pixels 7 are acted on by current via current sources, with respect to which an upper and a lower reference current device 8a, 8b are shown in FIG. 1, as described in greater detail below with reference to FIGS. 4 and 5. Reference current devices 8a and 8b preferably form direct current sources, and supply different reference current values Iref to each of individual reference pixels 7, preferably as direct current values which are constant during a readout operation. Rows 2-2 and 2-3 may also be interchanged.

Pixel array 2 together with all pixels 5, 6, and 7 is initially provided uniformly, i.e., under identical production conditions, dark pixels 6 and reference pixels 7 being covered, preferably using the aluminum mask, which also covers webs 8 remaining between imager pixels 5. Imager pixels 5 as well as dark pixels 6 and reference pixels 7 are controlled and read out in a similar manner.

In addition to pixel array 2, image converter 1 has a device 10 for analog data processing and AD conversion which receives analog signals S1, S2, and S3 of pixel array 2, subsequently carries out analog processing of the signals, for example by filtering, and carries out an analog-to-digital conversion, so that the device outputs digital signals S4 to a device 12 for digital processing. Image converter 1 also has a control interface 14 and a device 16 for synchronization and timing ("timing and control") which receives a clock signal S7. Device 12 for digital processing outputs, via control interface 14, digital image signals S5 which contain information concerning pixel signals S1, S2, S3. Control interface 14 also receives control signals S6 and S9, S10 from an external control device 40 (only indicated here), which may be an FPGA or µC, for example. Control signals S6 may be supplied to all devices 10, 12, 16 via control interface 14. Devices 10, 12, 14, 16 thus form a readout and processing device whose proper operation is checked.

Figure 4:
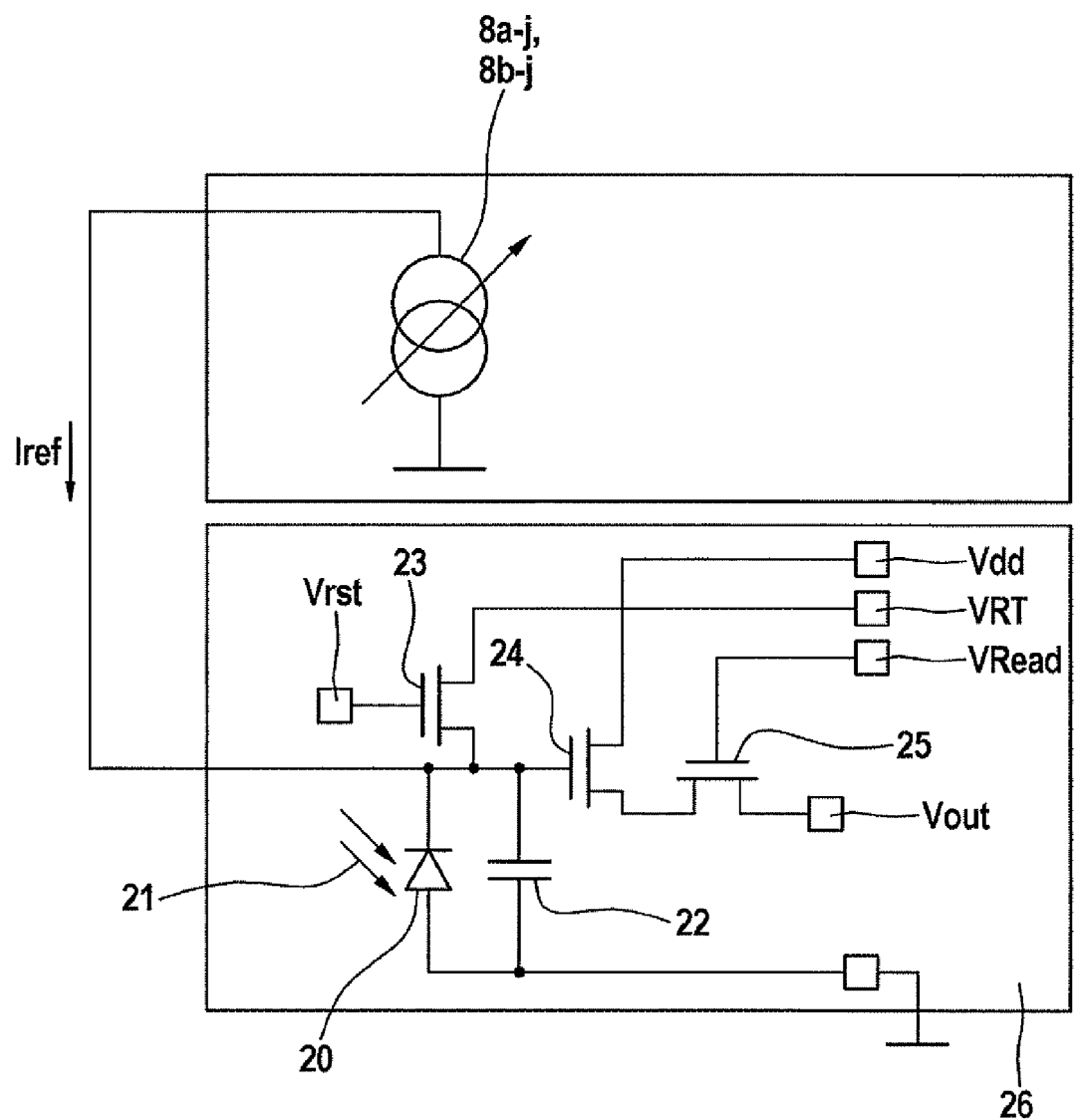
FIG. 4 shows the pixel control system from FIG. 3 in an enlarged illustration.

Reference current devices 8a and 8b supply individual reference pixels 7 in reference pixel rows 2-3 with different current values Iref, values Iref being a function of column number j; i.e., the two reference current devices 8a and 8b each represent multiple reference current sources 8a-j, 8b-j in order to output reference current values Iref (j) (i.e., Iref as a function of j) for individual reference pixels 7 having a different column number j. In FIG. 4, the lower circuit region is provided as a pixel architecture, i.e., a readout circuit 26, which is identical for all pixels 5, 6, and 7 and is basically known per se. Each pixel 5, 6, and 7 has a photodiode 20 for receiving incident light 21 (for example, in the visible or IR range), and a (parasitic) capacitor 22 which is provided in the semiconductor material or its border layers. The control is carried out via transistors, for example MOSFETs 23, 24, and 25. Transistor 23 is controlled via a reset control signal Vrst; Vrst controls transistor 23 via a positive potential in order to discharge parasitic capacitor 22 multiple times during a readout operation, i.e., to switch between ground V0 and applied potential VRT. Multiple resetting during a readout operation is used to ascertain even higher illuminations more accurately, since the pixel is less sensitive to higher illuminations; i.e., for the same intensity the photovoltage which is output decreases only slightly for higher illuminations or longer time periods. Transistor 24 is used as a source follower for transistor 23, and the drain of the former is connected to reference voltage Vdd. Transistor 25 is used as a readout amplifier, which is controlled by a control voltage VRead as readout control voltage, so that, similarly as for an output signal, a voltage Vout is read out which forms signal S3 of reference pixel 7.

For each reference pixel 7, the particular current source 8a-j, 8b-j is also connected in parallel to its photodiode 20 and its parasitic capacitor 22. Thus, corresponding to its output reference current Iref (j), current source 8a-j, 8b-j, which is adjustable for each reference pixel 7, charges parasitic capacitor 22. Since reference pixels 20 are covered, no appreciable light 21 strikes photodiode 20, so that in any event, for upper left reference pixel 7 in which j=1, which is supplied with Iref=0, the dark current is at best output by photodiode 20, the same as for dark pixels 6. Thus, reference current Iref of reference current devices 8a and 8b is used as a "substitute" for incident light 21 or as a defined reference grayscale value for reference radiation, in order to subsequently check the transmission characteristics or transmission errors via elements 10, 12, 14, 16 of FIG. 3. The output grayscale value of signal S3 of upper left reference pixel 7, in which Iref=0, should therefore correspond to the grayscale value of dark pixels 6.

According to FIG. 2, current sources 8a, 8b may be configured by external control device 40 via control interface 14, with the aid of control signals S9, S10, in order to adjust the particular current values for the individual reference pixels 7. Furthermore, reference current devices 8a and 8b may also be preset during manufacture, and thus may output fixed current values Iref (j) for each pixel 7 of a reference pixel row 2-3.

Figure 5:
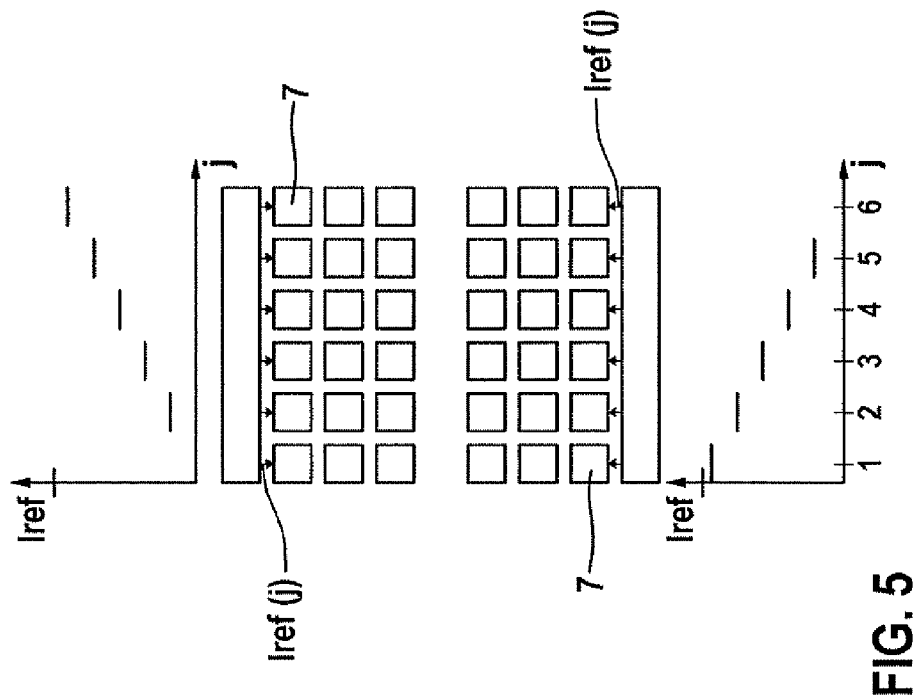
FIG. 5 shows illustrations of the grayscale values of the lower and upper reference pixel rows.

According to FIG. 5, in the upper current pixel diagram of upper reference pixel row 2-3, for example, reference current values Iref may increase to the right with increasing column number j, in particular incrementally, for example linearly or also logarithmically, until at last reference pixel 7, i.e., j=6 in this case, Iref corresponding to a maximum light incidence. Upper and lower reference pixel rows 2-3 may each be controlled pixel by pixel, using the same reference current values Iref. In addition, according to FIG. 5 lower reference pixel row 2-3 may be set exactly oppositely from upper reference pixel row 2-3, so that set reference current values Iref or the grayscale value decrease(s) with increasing j, similarly as for a linear conversion characteristic curve, for example. Thus, the analog output signals may be simply added column by column, in which the analog output signals of the two reference pixels 7 having the same column number j are added in each case, and a check is made to determine whether this sum is constant over j, deviations being easily identifiable. The evaluation may be easily carried out on the chip, for example, using an adder and a comparator, or also by external control device 40. Similarly, other advantageous adjustments of the current values are also possible. Thus, for the same control on a column basis, i.e., control using the same reference current values, for example a column-based subtraction may be carried out in which analog reference pixel signals S3 which are output are subtracted from reference pixels 7 having the same column number j.

According to example embodiments of the present invention, variable, chargeable, or adjustable test patterns may be used for reference currents Iref for individual reference pixels 7, which therefore represent effective monitoring of the sensor function, and which in particular may be adapted to the particular circumstances, for example also as a function of an overall identified incident intensity, for example as a function of daytime or nighttime functions.

In the known adjustment of reference currents Iref, the result of reference pixels 7 may be predicted and computed as a function of the setting or addressing of the readout and control path of image converter 1, which proceeds via output signals S1, S2 and S3 and analog processing device 10 to device 12 for digital processing. Taking into account the conversion characteristic curve which is set via control interface 14, the result of reference pixels 7 may be computed, and the actual result may be compared to the setpoint value. A match of the two values indicates an intact readout path in the analog and the digital ranges. Conclusions may also be drawn concerning an absence of errors in control interface 14 and in the timing of device 16 for controlling and reading out the image converter. Reference current devices 8a, 8b shown in FIGS. 3 and 4 may, for example, be formed by a register having a connected digital-analog converter DAC, thus allowing the reference values to be dynamically changed by appropriate charging of the register.

Figure 3:
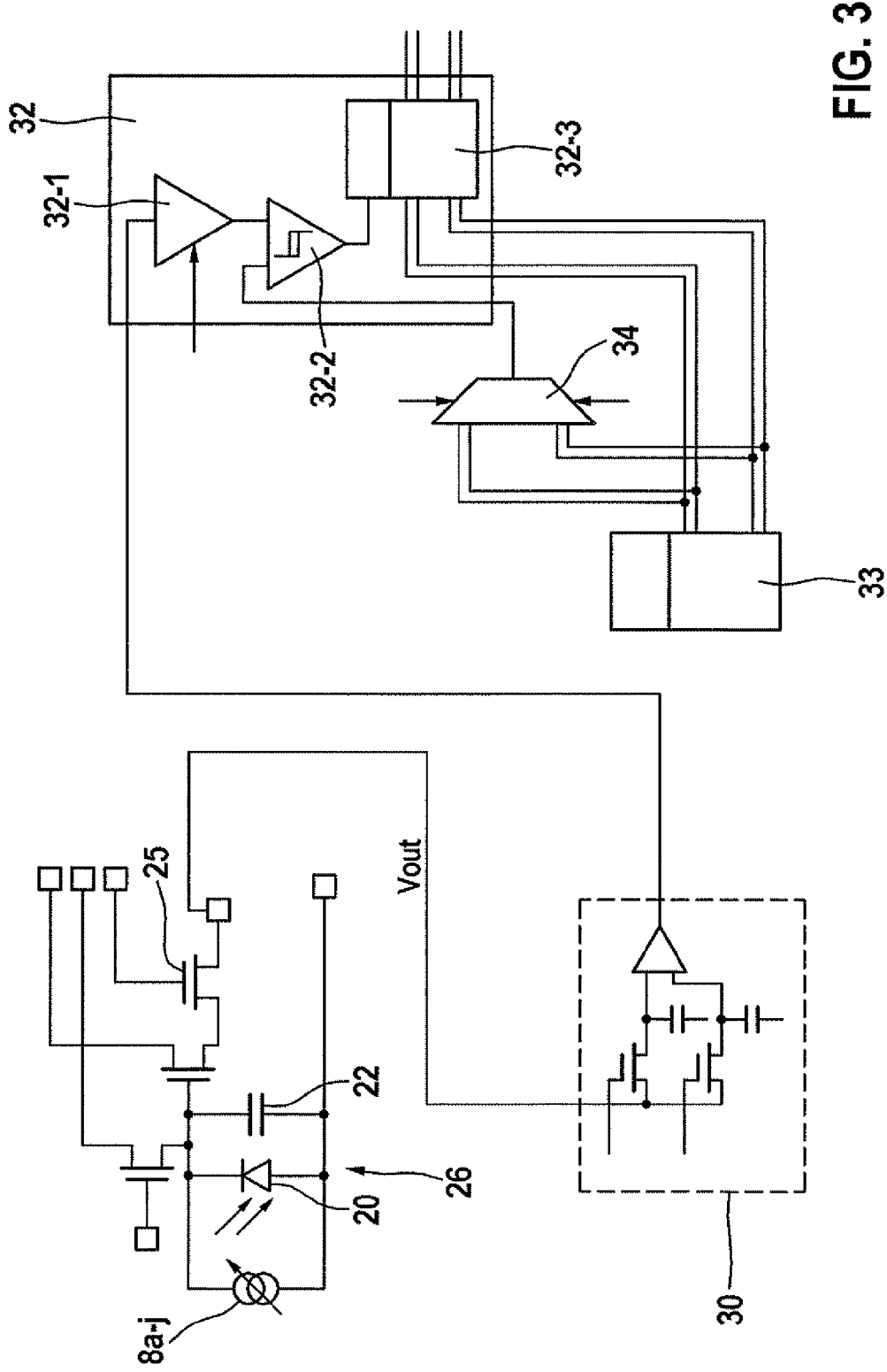
FIG. 3 shows a readout circuit for reading out the pixel array.

In addition to the pixel architecture, FIG. 3 shows the subsequent readout circuit in greater detail: voltage value Vout output by readout transistor 25 is read out by a correlated double sampling (CDS) readout circuit 30 and supplied to an analog-digital converter 32, which in the present example has an amplifier 32-1, a comparator 32-2, and a buffer 32-3; the comparative voltage is also provided to comparator 32-2 by a counter 33 via a digital-analog converter 34. This additional circuit is basically conventional.

Figure 6:
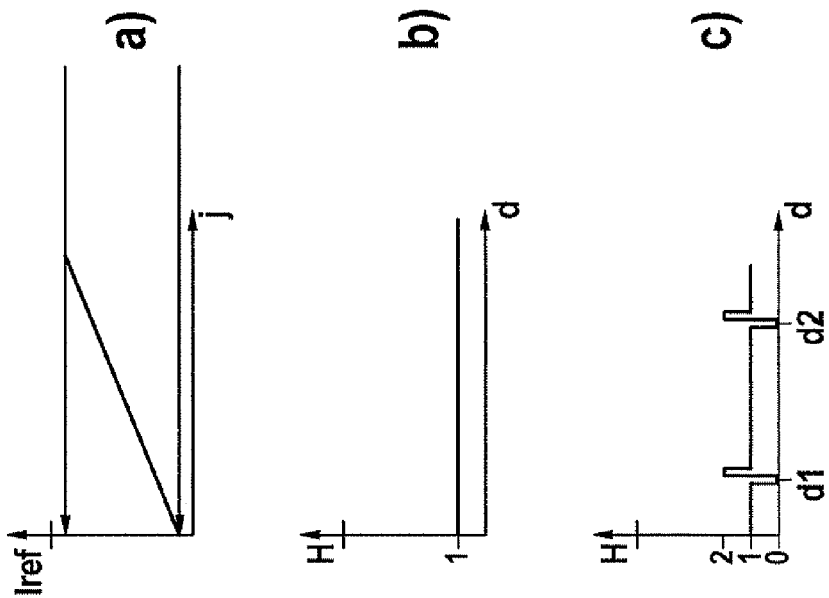
FIG. 6 shows (a) the output signal of the reference pixels in one row as a function of the number of pixels, together with two analog reference signals, (b) a histogram of a correctly converting analog-digital converter as a diagram of the frequency of occurrence of the digital output values, and (c) a corresponding histogram of an incorrectly converting ADC.

According to FIG. 6a, analog reference current Iref along reference pixel row 2-3 may be adjusted in a linearly increasing manner from the minimum current value, in particular near the dark current, to a maximum expected intensity corresponding to a photocurrent, forming a steplike progression due to the discrete number of pixels, unlike the idealized illustration of FIG. 6a. In addition, according to example embodiments of the present invention repetitions in the curve progression are possible, for example a saw-toothed progression successively following multiple linear progressions. Since the entire expected intensity range is thus reproduced by reference current values, the correct behavior of the connected analog-digital converters in device 10 may be tested. Any brightness value to be converted may be simulated during readout of a complete reference pixel row 2-3. FIG. 6b shows a histogram of the frequency of occurrence H of digital output values d, i.e., illustrated in a simplified manner by d=0, 1, 2, 3, 4, . . . . Thus, when devices 10, 12, 14, 16 are operating correctly, the constant progression for which H=1 in FIG. 6b is expected. FIG. 6c shows an example of a histogram for an incorrectly converting ADC in which two digital output values d1 and d2 are absent, resulting in, for example, twice the frequency of occurrence of the subsequent digital output value; thus, for example, digital output values d1 and d2 have been output slightly in excess due to an error in the ADC.

What is claimed is:

1. An image converter, comprising:
   a pixel array having multiple imager pixels adapted to output imager pixel signals; and
   a readout and processing device adapted to read out the pixel array and to receive and process the imager pixel signals;
   wherein the pixel array includes multiple reference pixels adapted to output reference pixel signals, and at least one reference current device adapted to output reference currents to the multiple reference pixels to simulate illumination intensities; and
   wherein the readout and processing device is adapted to jointly read out, receive, and process the reference pixel signals and the imager pixel signals;
   wherein the at least one reference current device includes reference current sources adapted to supply the multiple reference pixels with different reference current values, the reference current sources each being connected in parallel to a parasitic capacitor and to a photodiode of a particular reference pixel, and the reference current sources adapted to charge the parasitic capacitor with a reference current value during readout operation.

2. The image converter according to claim 1, wherein the reference currents supplied to the multiple reference pixels vary between a minimum value for reproducing a dark current and a maximum value for simulating a maximum illumination.

3. The image converter according to claim 1, wherein the multiple reference pixels are shielded from external incidence of light by a metal mask provided in the pixel array for delimiting the pixels of the pixel array.

4. The image converter according to claim 3, wherein the pixel array includes dark pixels adapted to output dark pixel signals, which are shielded from external incidence of light and are adapted to be free from action by the reference currents, the readout and processing device adapted to jointly read out, receive, and process the dark pixel signals together with the reference pixel signals and the imager pixel signals.

5. The image converter according to claim 1, wherein the multiple reference pixels are arranged in reference pixel rows, the pixel array having multiple rows of imager pixels and at least one reference pixel row, and the rows of the pixel array being readable at least one of (a) in succession and (b) column by column by a readout circuit.

6. The image converter according to claim 1, wherein the at least one reference current device is at least one of (a) controllable and (b) adjustable by control signals for changing the reference currents.

7. The image converter according to claim 1, wherein the image converter has two reference pixel rows and two dark pixel rows, the imager pixels being arranged in a submatrix of the pixel array, and a reference pixel row and a dark pixel row each being respectively arranged above and below the submatrix.

8. The image converter according to claim 7, wherein the reference pixels in an upper and a lower reference pixel row having a same column number are supplied with different reference current values, and at least one of (a) a sum and (b) a difference of analog reference pixel signals of the reference pixels in the upper and the lower reference pixel row is substantially constant for the same column number.

* * * * *